United States Patent [19]

Fukuoka et al.

[11] Patent Number: 4,870,247
[45] Date of Patent: Sep. 26, 1989

[54] METHOD AND APPARATUS FOR CONTROLLING A WELDING ROBOT FORMING A NONUNIFORM WELD SATISFYING PREDETERMINED CRITERIA RELATED TO AN INTERSPACE BETWEEN ELEMENTS BEING WELDED

[75] Inventors: Hisahiro Fukuoka, Takarazuka; Yutaka Takano; Yoichi Kamiyama, both of Tsuchiura, all of Japan

[73] Assignees: Hitachi Construction machinery Co., Ltd., Tokyo; Shin Meiwa Industry Co., Ltd., Hyogo, both of Japan

[21] Appl. No.: 138,383
[22] PCT Filed: Jul. 17, 1986
[86] PCT No.: PCT/JP86/00370
§ 371 Date: Nov. 20, 1987
§ 102(e) Date: Nov. 20, 1987
[87] PCT Pub. No.: WO87/05549
PCT Pub. Date: Sep. 24, 1987

[30] Foreign Application Priority Data

Mar. 20, 1986 [JP] Japan .................................. 61-62561
Mar. 31, 1986 [JP] Japan .................................. 61-74610
Apr. 25, 1986 [JP] Japan ............................. 61-63394[U]

[51] Int. Cl.⁴ .............................................. B23K 9/12
[52] U.S. Cl. .............................. 219/125.1; 219/125.12
[58] Field of Search ........... 219/125.12, 125.1, 125.11, 219/124.34

[56] References Cited

U.S. PATENT DOCUMENTS 4,163,886 8/1979 Omae et al. ..................... 219/125.11

FOREIGN PATENT DOCUMENTS 59-193770 11/1984 Japan .

Primary Examiner—Clifford C. Shaw
Attorney, Agent, or Firm—Lowe, Price, LeBlanc, Becker & Shur

[57] ABSTRACT

A welding torch (4) of a welding robot (RO) is supported by arms (2, 3), to be movable under the control of a computer (7). First and second members (W1, W2) are welded by a mold woven while oscillating an welding torch (4) along a weld line (WL), with data on changes in an interspace between the first and second welded members (W1, W2) along a direction of the weld line (WL) being previously obtained and stored in advance of welding. For the welding, the computer 7 performs arithmetic to obtain command values on the basis of the stored data to output the same to the welding robot (RO), so that the welding robot (RO) performs weaving in accordance with the command values while varying a weaving amplitude of the welding torch (4) in response to the change in the interspace.

10 Claims, 12 Drawing Sheets

| STEP NO. | POINT OF POSITIONAL DATA | L.C.W OR S | WELDING CONDITION W NO. | CORRECTION SYSTEM AUX NO. |
|---|---|---|---|---|
| 1 | $P_1$ | L | | |
| 2 | $P_2$ | W | 01 | 99 |
| 3 | $P_3$ | W | 01 | 99 |
| 4 | $P_4$ | W | 01 | 99 |
| 5 | $P_5$ | W | 01 | 99 |
| 6 | $P_6$ | W | 01 | 99 |
| 7 | $P_7$ | W | 01 | 99 |
| 8 | $P_8$ | L | | |

| STEP NO. | POINT OF POSITIONAL DATA | L.C.W. CW OR S | WELDING CONDITION W NO. | CORRECTION SYSTEM AUX NO. | ONE-PITCH INFORMATION NO. | TIMER NO. |
|---|---|---|---|---|---|---|
| 1 | $P_1$ | L | | | | |
| 2 | $P_2$ | CW | 01 | 99 | 1 | 1 |
| 3 | $P_3$ | CW | | 99 | | |
| 4 | $P_4$ | CW | | 99 | | |
| 5 | $P_5$ | CW | | 99 | | |
| 6 | $P_6$ | CW | | 99 | | |
| 7 | $P_7$ | CW | | 99 | | |
| 8 | $P_8$ | CW | | 99 | | |
| 9 | $P_9$ | CW | | 99 | | |
| 10 | $P_{10}$ | CW | | 99 | | |
| 11 | $P_{11}$ | CW | | 99 | | |
| 12 | $P_{12}$ | L | | | | |

FIG. 15
| STEP NO. | POINT OF POSITIONAL DATA | L,C,As OR S | SEM NO. | SPEED V | WELDING CONDITION W NO. | FUNCTION F NO. | CORRECTION SYSTEM AUX NO. |
|---|---|---|---|---|---|---|---|
| 1 | $P_0$ | L | | $V_0$ | | | |
| 2 | $P_0$ | S | 99 | | | | |
| 3 | $SP_1$ | L | | $V_0$ | | | |
| 4 | $P_1$ | S | 01 | | | | |
| 5 | $SP_2$ | L | | $V_0$ | | | |
| 6 | $P_2$ | S | 02 | | | | |
| 7 | $P_3$ | L | | | | | |
| 8 | $P_4$ | As | 01 | | 01 | | 98 |
| 9 | $P_5$ | As | 01 | | | 7 | 02 |
| 10 | $P_6$ | As | 02 | | | | 98 |
| 11 | $P_7$ | L | | | | | |
FIG. 17(a)
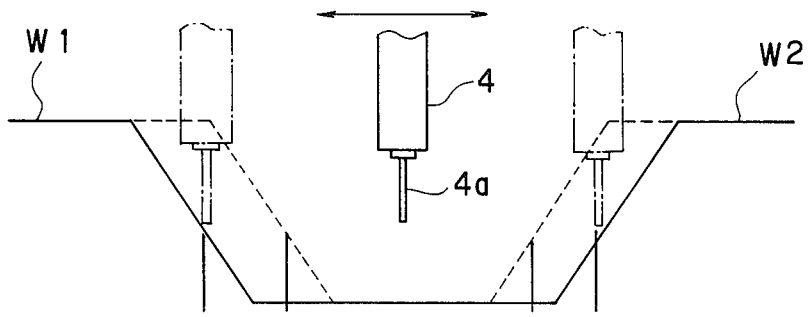
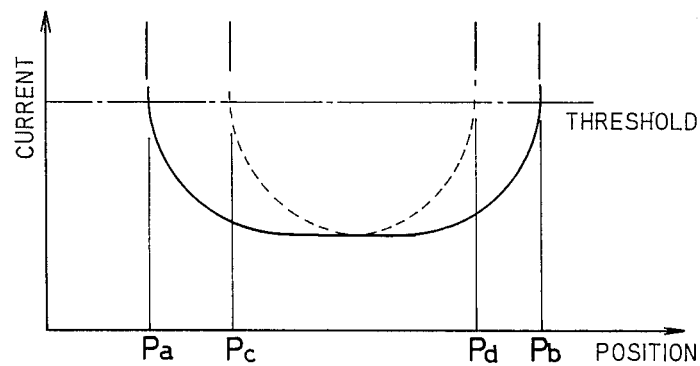
FIG. 17(b)

METHOD AND APPARATUS FOR CONTROLLING A WELDING ROBOT FORMING A NONUNIFORM WELD SATISFYING PREDETERMINED CRITERIA RELATED TO AN INTERSPACE BETWEEN ELEMENTS BEING WELDED

TECHNICAL FIELD OF THE INVENTION

The present invention relates to a method of and an apparatus for controlling a welding robot, and more particularly, it relates to a method of and an apparatus for controlling a welding robot for performing weaving between two members that are being welded in accordance with previously stored data relating to an interspace therebetween.

BACKGROUND OF THE PRIOR ART

One of important functions of a welding robot is weaving a weld between members being welded thereby. As is well known in the art, such weaving is a welding method of oscillating a welding torch substantially perpendicularly to a weld line to move the same along the weld line. In a conventional control method for making the welding robot perform such weaving, generally the oscillation width in the perpendicular direction, i.e., the weaving width amplitude is previously set in a computer as a constant value, to oscillate the forward end of the torch of the welding robot in the constant weaving amplitude and thereby to perform welding.

However, in the workpiece to be welded (hereinafter referred to as "welded member", and when two members are to be welded to each other, as "first" and "second" welded members respectively), the butting space and bevel width between the first and second welded members (generically referred to as an "interspace" between the welded members) are frequently not uniform in the weld line direction. This is due to variations and integrated errors in cutting accuracy, bending accuracy and assembling accuracy caused by bending and distortion of materials. When such welded members are joined by a weld woven by a welding robot through application of the conventional control method, the welding is performed in the constant weaving amplitude regardless of the nonuniformity of the interspace therebetween, whereby under-and-overwelding is caused depending on positions, to very seriously lower the weld quality.

Therefore, manual welding has been generally required to weave welded members having a ununiform interspace between them.

SUMMARY OF THE INVENTION

Accordingly, an object of the present invention is to solve the aforementioned problem of the prior art and provide a method of controlling a welding robot which can perform exact qualities of weaving even if the interspace between welded members is ununiform along the weld line direction, thereby to secure welding accuracy of high quality.

The present invention is directed to a method of and an apparatus for controlling a welding robot for weaving first and second welded members by a welding robot having a welding torch and arms movably supporting the welding torch while oscillating and moving the welding torch along the weld line of the welded members.

According to the present invention, data on change in the interspace between the first and second welded members along the weld line direction are previously stored in advance of the welding, in order to attain the aforementioned object. On the basis of the stored data, arithmetic is so performed as to form the weld while varying the weaving amplitude with the aforementioned change in the interspace to obtain command values, which command values are outputted to control the motion of the welding robot.

Therefore, even if the interspace between the welded members is nonuniform, such nonuniformity is heated as a change in the interspace along the weld line direction so that the weaving amplitude is varied with the nonuniformity, whereby the weaving is neither too much nor too little, to secure welding accuracy of high quality.

The aforementioned and other objects and effects of the present invention will become more apparent from the following description when taken with reference to the accompanying drawings.

BRIEF DESCRIPTION OF THE DRAWINGS

FIG. 15 is a step diagram of a program employed in the third embodiment of the present invention.

FIG. 17 is an explanatory diagram of an amplitude variable method according to the third embodiment of the present invention.

DESCRIPTION OF THE PREFERRED EMBODIMENTS

Figure 1:
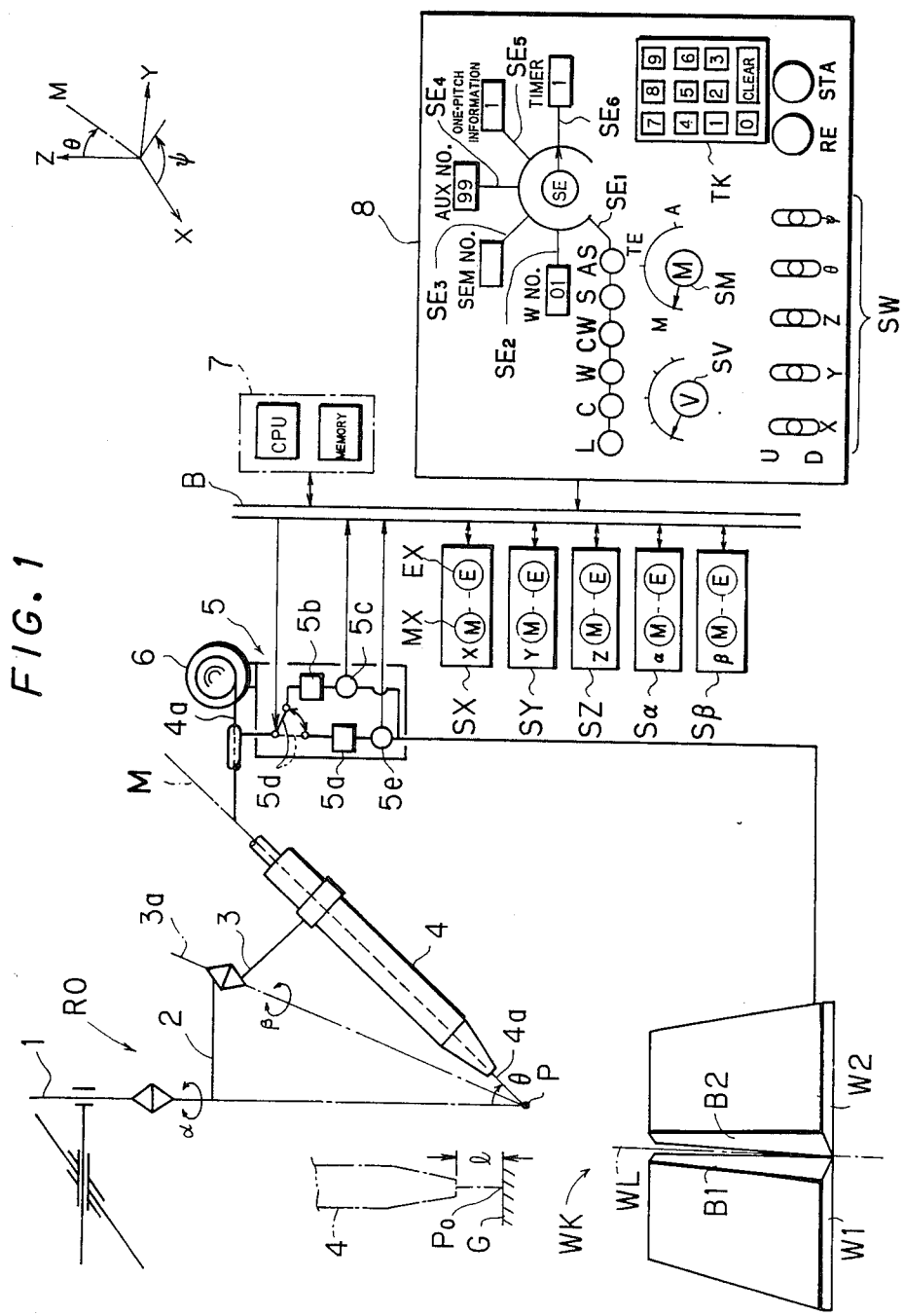
FIG. 1 is a general view of a welding robot according to the preferred embodiments of the present invention.

FIG. 1 is a general schematic diagram of an (X, Y, Z) rectangular coordinate system robot RO employed as a welding robot forming the background of the present invention.

A vertical shaft 1 formed at a terminal end of the welding robot RO (not shown in detail) supports a first arm 2 to be swingable about the shaft 1 (in the direction of the arrow α). Provided in the forward end of the first arm 2 is a second arm 3 supported to be swingable about an inclined shaft 3a (in the direction of the arrow β). A welding torch 4 (MIG welding torch in this embodiment) serving as an end effector is mounted on the forward end of the second arm 3.

The shaft 1, the shaft 3a and a central axis M of the torch 4 are adapted to intersect with each other at a point P. Further, the torch 4 is so set that its welding working point corresponds to the point P. In such structure, angles of rotation in the directions of the arrows α and β are so controlled that an attitude angle θ and a rotation angle ψ (the so called Euler's angle) of the torch 4 with respect to the vertical shaft 1 can be controlled with the point P being fixed.

An apparatus 5 is an electric source for welding. This apparatus 5 comprises a spool 6 on to which consumable electrode 4a of the torch 4 is wound, and is adapted to be capable of delivering the electrode 4a by rotating of a feed roller, the detail of which is not shown in the FIGURE, and capable of connecting a weld source 5a between the electrode 4a and a workpiece WK. A welding state detector (current sensor) 5e is connected in series to the weld source 5a. The apparatus 5 further comprises a detector source 5b. This detector source 5b is preferably restricted to a voltage of about 100 to 2000 V and a small current, for example. A welding state detector (current sensor) 5c is connected in series to the detector source 5b, and these and the source 5a and the current sensor 5e are switchable by a switching means 5d.

A well-known computer 7 serving as a control unit for the entire structure of the embodiment includes a CPU and a memory, and the source 5a, the current sensors 5c and 5e and the switching means 5d are connected to a bus line B of the computer 7.

Further, a servo system SX for the X axis motion of the robot RO is connected to the bus line B, which servo system SX includes a power supply MX for the X axis motion and an encoder EX for outputting positional data thereof. Similarly, a servo system SY for the Y axis, a servo system SZ for the Z axis, a servo system Sα for the α axis and a servo system Sβ for the β axis in similar structure are conected to the bus line B.

A remote operation panel 8 comprises a manually operated snap switch group SW for manually moving the torch 4, a speed command rotary switch SV for commanding speeds other than that for welding, mode selector switches SM for switching three types of modes (manual mode M, test mode TE and automatic mode A), a ten-key TK. Also included are a condition setting selector switch SE for setting various conditions in respective switching positions, as hereinafter described, through operation of the ten-key TK, a correction switch RE and a start switch STA employed for starting operaions in respective modes and fetching teaching contents in the meory.

The aforementioned selector switch SE has the following six switching positions $SE_1$ to $SE_6$:

(1) Switching Position $SE_1$ ... has six indicator lamps of linear interpolation "L", circular interpolation "C", weaving "W", circular weaving "CW", sensing "S" and arc sensing "AS", so that the respective indicator lamps can be selected by pushing key numbers "1" to "6" of the ten-key TK to turn on the same.

(2) Switching Position $SE_2$ ... has an indicator part of welding condition numbers W No. and the memory of the computer 7 previously stores welding voltage E, welding current I and welding speed Vw in a set for each number so that a desired set can be called by a key number of the ten-key corrsponding to the set.

(3) Switching Position $SE_3$ ... has an indicator part of sensor menu numbers SEM No. and the memory of the computer 7 stores subroutines required for sensing the weld line of the workpiece WK by the electrode 4a of the torch 4 itself as a set for each number, so that the same can be called at any time by operating the ten-key TK.

(4) Switching Position $SE_4$ ... has an indicator part of correction system numbers AUX No., so that the weaving amplitude can be made variable by pushing a prescribed key number (for example, "98" or "99" in the embodiment as hereinafter described) of the ten-key TK.

(5) Switching Position $SE_5$ ... has a one-pitch information indicator part, so that the distance to be advanced in the weld line direction in one oscillation can be set by a menu number.

(6) Switching Position $SE_6$ ... has a timer indicator part, so that stop times on left and right ends of oscillation can be set by a menu number.

In the first embodiment of the present invention, the workpiece WK is formed by two horizontal plates W1 and W2 serving as first and second welded members respectively provided with bevels B1 and B2 as shown in FIG. 1, which horizontal plates W1 and W2 are to be welded in a butting manner. It is assumed that the space of butting is not uniform due to some cause, such that the horizontal plates W1 and W2 are in contact with each other at the lower ends thereof but are slightly separated from each other in the upward (faraway) direction, as shown in the FIGURE.

Descrption is now provided of the processing according to the first embodiment of the present invention, with reference to parts related to the features of the present invention. The first processing is teaching, which is now described with reference to FIG. 1 and FIG. 2 showing positional relation of teaching points and the like and FIG. 3 showing the steps of the program.

(1-1) An operator of this apparatus first operates the switch SM to select the manual mode M. Then the switch SW is operated to locate the torch 4 in an arbitrary point $P_1$ close to a welding start point $P_2$ (see FIG. 2). Then the selector switch SE is switched to the switching position $SE_1$, to set linear interpolation "L" by operating the ten-key TK. Then, when the switch STA is operated, the computer 7 fetches the positional information of the point $P_1$ and the information of linear interpolation "L" as data on a step No. 1 shown in FIG. 3.

(1-2) Then the operator located the torch 4 in the welding start point $P_2$ in a condition suitable for welding. Then the selector switch SE and the ten-keys TL are operated to select weaving "W", welding condition "01" and correction system "99". Within these, "01" indicating the welding condition is a number set in correspondence to a condition suitable for weaving. Setting of the correction system "99" meanes teaching of performance of weaving in a variable amplitude mode. Through such operation, data on a step No. 2 in FIG. 3 are inputted. While input of one-pitch information and setting of a timer are also performed, the same are described fully with reference to a second embodiment hereinafter.

Figures 2, 3:
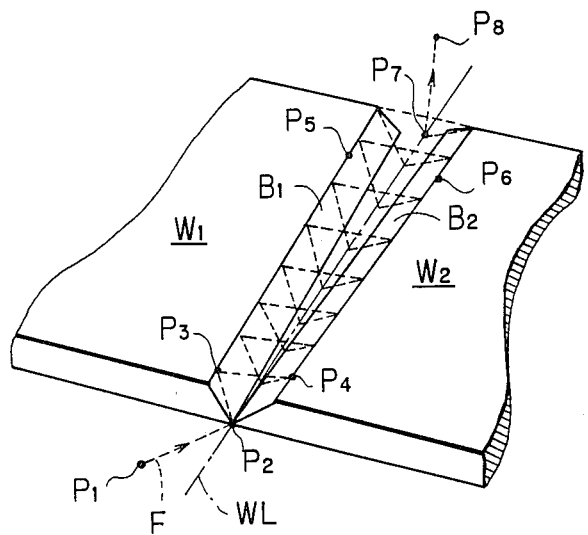
FIG. 2 is a view showing the manner of setting teaching points and the locus of a welding torch in a first embodiment of the present invention.
FIG. 3 is a step diagram of a program employed in the first embodiment of the present invention.

(1-3) to (1-6) Data input as to steps No. 3 to No. 6 shown in FIG. 3 is set with weaving "W", welding condition "01" and correction system "99" similarly to the data input as to the aforementioned step No. 2, while locations of the torch 4 are as follows respectively: As shown in FIG. 2, a teaching point $P_3$ corresponding to the step No. 3 is a point (on the edge of the bevel B1) to be first reached upon starting of weaving oscillation from the welding start point $P_2$. A teaching point $P_4$ corresponding to the step No. 4 is a point (on the edge of the bevel B2) to be subsequently reached upon oscillation inversion at the point $P_3$. A point to be subsequently reached from the point $P_4$ is the leg (no referece numeral assigned) of a perpendicular from the point $P_4$ to the weld line WI, and thereafter the pattern of the point $P_2$ to $P_4$ is repeated (with amplitude being changed), so that data on one cycle of the oscillation pattern for weaving are fetched by teaching these points $P_2$ to $P_4$, and particularly the weaving pitch is indicated as the distance between the points $P_2$ and $P_4$ in the direction of the weld line WI. The amplitude obtained from the data is that in the start of welding. In such viewpoint, the two points $P_3$ and $P_4$ have meaning as "pattern points".

On the other hand, two points $P_5$ and $P_6$ corresponding to the steps No. 5 and 6 are set in arbitrary points on the edges of the bevels B1 and B2 and different from the aforementioned points $P_3$ and $P_4$. These two points $P_5$ and $P_6$ are set as data for recognizing change in the interspace between the horizontal plates W1 and W2 along the weld line direction, but are not points for passing the torch 4 in actual welding. In other words, the points $P_5$ and $P_6$ are data input dedicated points employed only for recognizing the change in the interspace.

Description is now provided on the reason why the change in the interspace between the horizontal plates W1 and W2 can be recognized by adding the aformentioned two points $P_5$ and $P_6$. In the horizontal plates W1 and W2 employed in this embodiment, both of the bevels B1 and B2 thereof are assumed to be substantially linear. Thus, the change in the interspace between the horizontal plates W1 and W2 in the respective points on the weld line WL can be recognized through the degree of spacing between the bevels B1 and B2 along the weld line WL. Since both of the bevels B1 and B2 are linear, directions of the respective bevels can be recognized by recognizing positional coordinates of single points on the respective bevels, i.e., two points in total additionally to the pattern points $P_3$ and $P_4$. Therefore, the points $P_5$ and $P_6$ may be additionally taught in order to recognize the positons and directions of the bevels B1 and B2 respectively. In order to accurately recognize the degree of spacing, the distance between the points $P_3$ and $P_5$ and that between the points $P_4$ and $P_6$ are preferably as large as possible.

Such information is not necessarily inputted through setting the torch 4 to concrete locations, but by some preassumable patterns of change in the interspace may be prepared to be selected and inputted in a menu system. In this case, such data may be inputted with teaching data on the welding start point $P_2$ or an end point $P_7$ (hereinafter described), for example.

(1-7) A point $P_7$ corresponding to the step No. 7 is a welding end point. Therefore, the torch 4 is located in this point to input weaving "W", welding condition "01" and correction system "99" sumilarly to the case of the aforementioned points.

(1-8) A point $P_8$ inputted in correspondence to the step No. 8 is a point serving as a refuge point after completion of welding, and information of this positon is fetched with linear interpolation "L" designated.

The basic operation for teaching is completed in the aforementioned manner, while some appropriate points may be selected as sensing points to teach positional data and sensing modes with respect to these points before inputting the data on the aforementioned points $P_1$ to $P_8$ in case of simultaneously performing the so-called sensing. In order to make sensing of the data on the change in the interspace between the horizontal plates W1 and W2, i.e., the degree of spacing, two points each for the bevels B1 and B2, i.e., or four points in total, may be provided as sensing points, for example (other methods can also be employed).

Description is now provided on a playback operation of the welding robot RO. When the mode selector switch SM is set at the test mode TE to operate the switch STA, the welding robot RO executes an operation similar to welding operation as hereinafter described, without performing welding. The operator monitors the operation, to perform correction if errors are present in the data in teaching. Then the operator re-locates the torch 4 and sets the mode selector switch SM at the automatic mode A, to operate the switch STA. The operation for actual weaving is started from this point of time, and the processing thereafter is described with reference to a flow chart shown in FIG. 4.

At processing 101, a determination is made as to whether or not the corresponding step (corresponding step in FIG. 3) is weaving "W". If the result of the determination is not weaving "W", the process is advanced to processing 102, at which a determination is made as to whether or not the mode is sensing "S". Although sensing "S" is not included in the respective steps of FIG. 3, the sensing data may be included as hereinabove described, and in this case, the process is advanced to the processing 103 to carry out the sensing in the sensing step, thereby to correct the data in teaching at processing 104 by data obtained by the sensing. Such sensing can be performed in the form of sensing through the electrode 4a by connecting the detector source 5b and the current sensor 5c between the torch 4 and the workpiece WK. The details of the sensing processing are hereinafter described more fully with reference to a third embodiment. This sensing correction is effective for correction of individual differences between the welded members and individual mounting differences. In case where the determination at the processing 102 is other than sensing "S", e.g., linear interpolation "L" or circular interpolation "C", the content of the corresponding step is executed at processing 105.

When the result of the determination at the processing 101 is weaving "W", on the other hand, a determination is made as to whether or not the weaving is amplitude variable at subsequent processing 106. Such determination can be made by determining whether or not "99" as the correction system (AUX No.) is set as data in the corresponding step. When the result of the determination is not amplitude variable, weaving is performed at subsequent processing 107 by general weaving, i.e., previously set constant amplitude. If the result of the determination is amplitude variable to the contrary, the process is advanced from the processing 106 to processing 108, whereby weaving is performed by varying the weaving amplitude in response to the change in the interspace between the first and second welded members along the weld line direction. When the processing 104, 105, 107 or 108 is completed, a determination is made at processing 109 as to whether or not the step is a final step, to complete the series of processing steps when the result of the determination is the final step, while updating the step at processing 110 when the result of determination is not the final step to return to the processing 101 and repeat the aforementioned process.

FIG. 2 shows the locus F of the forward end of the torch 4 in application of the step data shown in FIG. 3 to such a processing flow. In this case, the forward end of the torch 4 is first moved from the point $P_1$ to the point $P_2$ by linear interpolation in response to the data of the step No. 1 of FIG. 3. Welding is started from the pint $P_2$, to weave the section to the point $P_7$ through the points $P_3$ and $P_4$ while varying the weaving amplitude. In this embodiment, the weaving amplitude is proportional to local spaces between the horizontal plates W1 and W2 in respective welding portions in the interval from the point $P_2$ to the point $P_7$. In such processing, data with respect to the change in the space between the horizontal plates W1 and W2 obtained from the aforementioned positional coordinate data of the points $P_3$ to $P_6$ may be numerically calculated in advance and stored in the memory, to be sequentially read in response to the positions of movement of the torch 4 as output with respect to the amplitude. Since the cycle of the weaving is previously set, a determination may be made as to which oscillation the point belongs to, in order to responsively perform arithmetic on data so as to obtain command values, thereby to ouput the same to the welding robot RO. In any case, the arithmetic is performed on the basis of previously supplied data.

As to the points $P_5$ and $P_6$, the fact that these are not passing points in actual welding must be indicated to the welding robot RO. The number of the teaching points relating to weaving of the horizontal plates W1 and W2 is set at six in this embodiment, and the CPU achieves that by being programmed to determine that position coordinates belonging to the fourth and fifth steps, within the steps of FIG. 3, from the step No. 2 at which amplitude variable weaving is started, i.e., the steps Nos. 5 and 6, are not passing points. Alternatively, data indicating that they are data input dedicated points may be added in teaching so that the points are neglected upon meeting with the data in reading. This similarly applies to designation of the start point, pattern points and end point of weaving.

Thus, the forward end of the torch 4 performs weaving while sequentially widening of the amplitude in FIG. 2, and, when the weaving is completed at the point $P_7$, the same is moved to the point $P_8$ by linear interpolation, thereby to complete the series of welding processing.

Figure 5A:
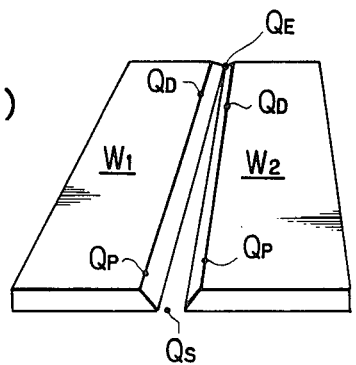
FIG. 5 is a view showing modes of data input with respect to modifications of the first embodiment of the present invention.
Figure 5B:
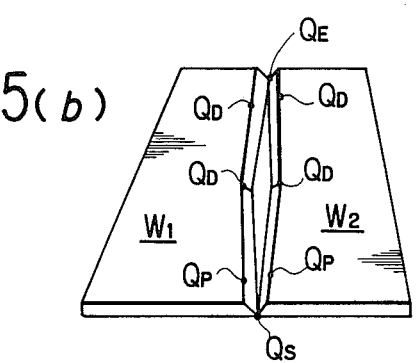

Although frontwardly extending nonuniformity in the interspace has been considered in the aforementioned first embodiment as shown in FIGS. 1 and 2, the present invention can be applied to the case of tapering as shown at FIG. 5(a) and the case where the change rate of the interspace is varied as shown at FIG. 5(b). In such cases, the shown points may be employed as welding start points $Q_S$, end points $O_E$, pattern points $Q_P$ and data input dedicated points $Q_D$ for supplying the aforementioned change data, for example, to enable processing similar to that in the first embodiment. The present invention is also applicable to workpieces other than the horizontal plates. The pattern of one cycle of weaving is not restricted to the illustrated one. Further, application of the present invention is not restricted to the case of a nonuniform interspace, but the same may be formed such that interspace change data are fetched in the meaning of "no change" upon meeting with welded members having uniform interspace in the amplitude variable mode to automatically perform weaving with constant amplitude with respect to the portion.

Figure 6:
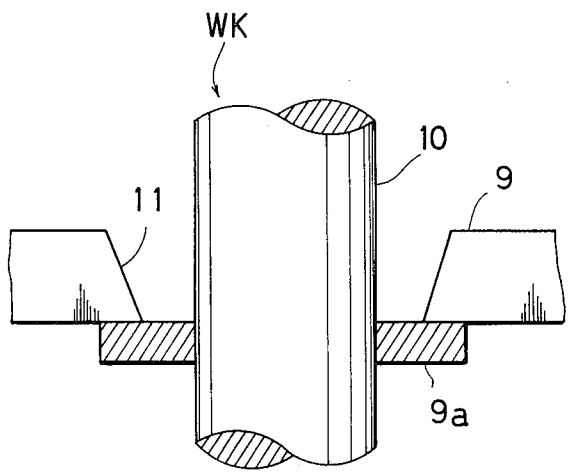
FIG. 6 is an explanatory diagram showing a workpiece in a second embodiment of the present invention.

In a second embodiment of the present invention, a workpiece WK is formed by a plate 9 serving as the first welded member and a shaft 10 serving as a second welded member as shown in FIG. 6. The plate 9 is provided with a bevel 11, and the shaft 10 is fitted in a boss part 9a so that an annular downwardly directed bevel portion is woven. As exaggeratedly shown in FIG. 7, the bevel width is nonuniform due to some cause, such that an outer circle and an inner circle forming contours of the bevel width are not concentric.

Processing in the second embodiment of the present invention is now described with reference to portions related to the features of the present invention. The first processing is teaching, which is described with reference to FIG. 7 showing the positional relation of teaching points and the like and FIG. 8 showing steps of the program, in addition to FIG. 6.

(2-1) First, the operator of this apparatus operates the switch SM to select the manual mode M. Then the switch SW is operated to locate the torch 4 in an arbitary point $P_1$ close to a welding start point $P_2$ (see FIG. 7). Then he switchies the selector switch SE is switched to the switching position $SE_1$, to set linear interpolation "L" by operation of the ten-key TK. Then, when the switch STA is operated, the computer 7 fetches the positional information of the point $P_1$ and the information of the linear interpolation "L" as data with respect to a step No. 1 in FIG. 8.

(2-2) Then the operator operates the switch SW, to locate the torch 4 in a welding start point $P_2$ on the outer circle in a condition suitable for welding. Then the selector switch SE and the ten-key TK are operated to select circular weaving "CW", welding conditon "01", correction system "99", one-pitch information "1" and timer "1". Within these, setting of the circular weaving "CW" means starting of weaving along a circular arc through circular interpolation, and "01" indicating the welding condition is a menu number set in correspondence to welding conditions (welding voltage, welding current and welding speed) optimum for the corresponding weaving. Further, the correction system "99" is set thereby to mean teaching of the fact that weaving thereafter is performed in an amplitude variable mode. In addition, the one-pitch information "1" is a menu number setting the optimum value of a distance p by which the welding torch 4 is to be advanced in the circumferential direction by one oscillation of weaving, and the timer "1" indicates a menu number for a time suitable for temporarily stopping the welding torch 4 in left and right ends of oscillation.

Figures 7, 8:
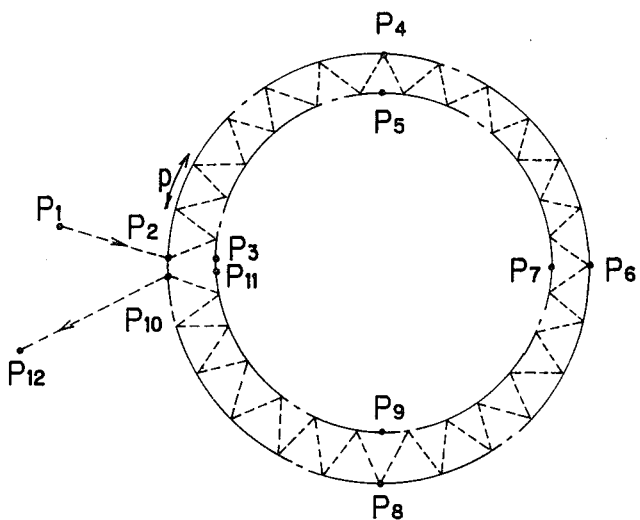
FIG. 7 is a view showing the manner of setting teaching points and the locus of a torch in a second embodiment of the present invention.
FIG. 8 is a step diagram of a program employed in the second embodiment of the present invention.

Then the switch STA is operated, so that the computer 7 fetches positional information on the welding start point $P_2$ and the aforementioned information as data with respect to a step No. 2 in FIG. 8.

(2-3) A point $P_3$ is selected as a position on the inner circle corresponding to the welding start point $P_2$ on the outer circle, and the torch 4 is located therein by operation of the switch SW. Then the selector switch SE and the ten-key TK are operated to select circular weaving "CW" and correction system "99". Then the switch STA is operated so that the computer 7 fetches positional information on the point $P_3$ as data related to a step No. 3. At this time, the computer 7 fetches the positional information on the point $P_3$ with respect to the step No. 3 in a pair with the positional information on the point $P_2$ with respect to the aforementioned step No. 2. Namely, when setting of "CW" and "99" designating amplitude variable circular weaving is performed in this embodiment, the continuously set points on the outer circle and the inner circle are always fetched in the computer 7 as a pair of positional information.

(2-4) The operator operates the switch SW to locate the torch 4 in a point $P_4$ on the outer circle in a condition suitable for welding. Then the selector switch SE and the ten-key TK are operated to select circular weaving "CW" and correction system "99", and then the switch STA is operated to fetch positional information on the point $P_4$, circular weaving "CW" and correction system "99" as data with respect to a step No. 4. If the welding condition, the weaving pitch or the timer is to be changed due to such circumstances that the welded members are changed in thickness after the point $P_4$ at this time, menu numbers therefor are also set. When there is no new setting, the setting is processed as continuation of the same conditions (i.e., welding condition "01", one-pitch information "1" and timer "1" set at the step No. 2).

(2-5) The operator selects a point $P_5$ as a position on the inner circle corresponding to the point $P_4$ on the outer circle, and operates the switch SW to locate the torch 4 therein. Then the selector switch SE and the ten-key TK are operated to select circular weaving "CW" and correction system "99", and then the switch STA is operated to fetch positional information on the point $P_5$ as data with respect to a step No. 5. Since "CW" and "99" designating amplitude variable circular weaving are currently set, the positional information on the point $P_5$ related to the step No. 5 is fetched in the computer 7 in a pair with the positional information on the point $P_4$ with respect to the aforementioned step No. 4 similarly to the above.

(2-6) Data input with respect to steps No. 6 to No. 9 shown in FIG. 8 is performed on the outer and inner circle alternately in sequence of $P_6 \rightarrow P_7 \rightarrow P_8 \rightarrow P_9$ with circular weaving "CW" and correction system "99" set similarly to the data input with respect to the aforementioned steps No. 2 to No. 5. If the welding condition, the pitch of weaving or the timer is to be changed halfway, at this time, the menu setting for the same is performed simultaneously with teaching for the point $P_6$ or the point $P_8$.

(2-7) A point $P_{10}$ and a point $P_{11}$ corresponding to steps No. 10 and No. 11 are welding end points. Since the entire circle is to be woven in this case, the end points $P_{10}$ and $P_{11}$ must be made to substantially correspond to the start points $P_2$ and $P_3$. Namely, the operator operates the switch SW to locate the torch 4 in the end point $P_{10}$ identical to the start point $P_2$ on the outer circle. Then the selector swithc SE and the ten-key TK are operated to select circular weaving "CW" and correction system "99", and the switch STA is operated to fetch positional information on the point $P_{10}$, circular weaving "CW" and correction system "99" as data with respect to the step No. 10. Then the switch SW is operated to locate the torch 4 in the end point $P_{11}$ identical to the start point $P_3$ on the inner circle. Then the selector switch SW and the ten-key TK are operated to select circular weaving "CW" and correction system "99", and the switch STA is operated to fetch positional information on the point $P_{11}$ as data with respect to the step No. 11. In this case, "CW" and "99" designating amplitude variable circular weaving are set, and the positional data on the end points $P_{10}$ and $P_{11}$ on the outer circle and the inner circle at the step Nos. 10 and 11 are fetched in the computer 7 in a pair.

(2-8) The switch SW is operated to locate the torch 4 in an arbitrary refuge point $P_{12}$ linearly shiftable from the welding end point $P_{10}$. Then the selector switch SE is switched to the switching position $SE_1$, the ten-key TK is operated to set linear interpolation "L" and the switch STA is operated so that the computer 7 fetches positional information on the point $P_{12}$ and the linear interpolation "L" as data with respect to a final step No. 12.

The basic operation of teaching is completed in the aforementioned manner, and in a case where the so-called sensing is simultaneously performed, appropriate points of the boss part 9 and the shaft 10 are selected as sensing points before inputting the data with respect to the points $P_1$ to $P_{12}$, to teach positional information of the selected points and sensing modes therefor. In this case, the positional data on the points $P_2$ to $P_{11}$ are corrected on the basis of the data obtained by the sensing with respect to each welded member thereby to start actual welding, as hereinafter described.

Figure 9:
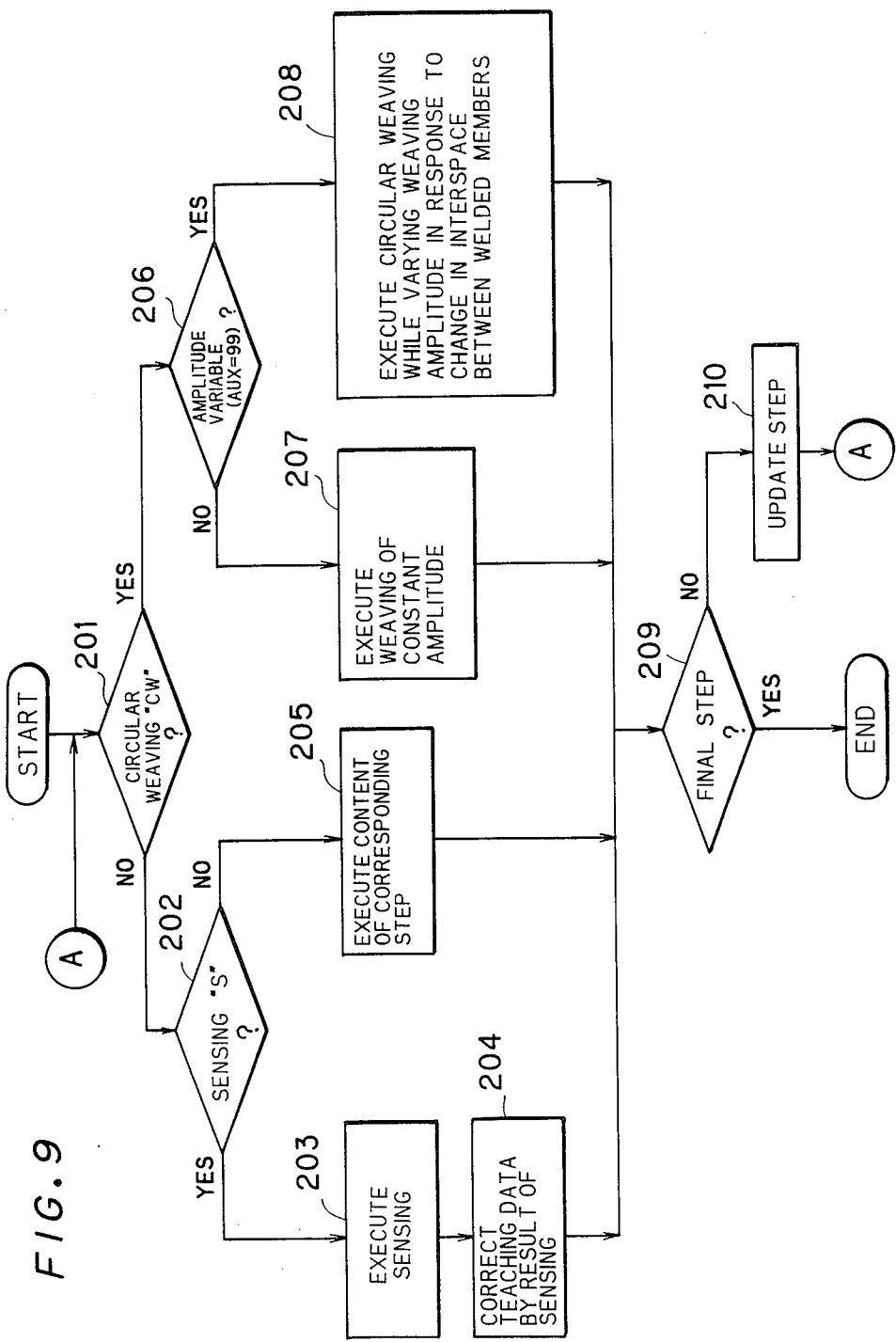
FIG. 9 is a flow chart showing the operation of the second embodiment of the present invention.

Description is now provided on the operation of the welding robot RO in the playback process. First, the mode selector switch SM is set at the test mode TE to operate the switch STA, whereby the welding robot RO executes operation similar to that in welding as hereinafter described, without performing welding. The oprator monitors the operation, to perform correction if errors are caused in the data in teaching or the like. Then the operator re-locates the torch 4, and sets the mode selector switch SM at the automatic mode A, to operate the switch STA. The operation for actual weaving is started from this point of time, and the processing thereafter is described with reference to a flow chart of FIG. 9.

First, a determination is made as to whether or not the corresponding step (corresponding step in FIG. 8) is for circular weaving "CW" at processing 201. If the result of the determination not circular weaving "CW", the process is advanced to processing 202, whereby a determination is made as to whether or not the mode is sensing "S". Although sensing "S" is not included in the respective steps of FIG. 8, sensing data may be included as hereinabove described, and in this case, the process is advanced to processing 203 in the sensing step to perform sensing, and thereafter the positional data on the points $P_2$ to $P_{11}$ in teaching are corrected at processing 204 on the basis of the data obtained by the sensing. Such sensing can be performed in the form of sensing by the elcetrode 4a by switching the switching means 5d so that the detector source 5b and the current sensor 5c are connected between the torch 4 and the workpiece WK. The detail of the sensing processing is described in relation to a third embodiment as hereinafter described. The sensing correction is effective in correction of individual difference between the welded members and individual mounting errors. With respect to a determination other than the sensing "S", e.g. linear interpolation "L" or circular interpolation "C", at the processing 202, the content of the corresponding step is executed at processing 205.

On the other hand, when the result of the determination at the processing 201 is circular weaving "CW", a determination is made at subsequent processing 206 as to whether or not the circular weaving is amplitude-variable. Such determination can be made depending on wheter or not "99" as the correction system (AUX, No.) is supplied as data in the corresponding step. If the result of the determination is not amplitude variable, weaving of a circular arc portion is performed by previously set constant weaving amplitude. If the result of the determination is amplitude variable to the contrary, the process is advanced from the processing 206 to processing 208, to perform weaving of the circular arc portion while varying the weaving amplitude with change in the interspace (bevel width defined by the outer circle and the inner circle of FIG. 7 in this embodiment) between the first and second welded members along the weld line. When the aforementioned processing 204, 205, 207 or 208 is completed, a determination is made as to whether or not the step is a final step at processing 209, whereby the series of processing steps is completed if the step, is final step while the step is updated at processing 210 if it is not a final step and the process is returned to the processing 201 to repeat the aforementioned processing.

FIG. 7 shows the locus F of the forward end of the torch 4 in the case of application of the step data of FIG. 8 to such a processing flow, in dotted lines. In this case, the forward end of the torch 4 is first moved from the point $P_1$ to the point $P_2$ in response to the data on the step No. 1 in FIG. 8 through linear interpolation. When the torch 4 reaches the point $P_2$, the computer 7 outputs a command indicating the weaving pattern from the point $P_2$ to the point $P_4$, whereby the torch 4 starts weaving in accordance with the welding condition "01" and the timer "1", to be advanced from the point $P_2$ to the point $P_4$ along the dotted lines shown in the FIGURE.

The weaving pattern started from the point $P_2$ to reach the point $P_4$ is created in the following manner, on the basis of the positional data on the points $P_2$ to $P_7$ and the one-pitch information "1". Namely, the locus of a circular arc portion $\widehat{P_2P_4}$ along the outer circle is obtained by a circle uniquely determined by three points $P_2$, $P_4$ and $P_6$ and the locus of a circular arc portion $\widehat{P_3P_5}$ along the inner circle is obtained by a circle uniquely determined by three other points $P_3$, $P_5$ and $P_7$. Then, the circular arc $\widehat{P_2P_4}$ is divided by the pitch p expresed by the one-pitch information "1", and a pitch as approximate as possible to the pitch p is selected if the same cannot be divided out, to equivalently divide the circular arc $\widehat{P_2P_4}$. Then, respective points are obtained on the circular arc $\widehat{P_3P_5}$ corresponding to substantially mid points of the respective divided points to sequentially connect them with the divided points, whereby the weaving pattern started from the point $P_2$ to reach the point $P_4$ can be obtained as shown by dotted lines in FIG. 7.

When the torch 4 reaches the point $P_4$, the computer 7 outputs a command indicating the weaving pattern from the point $P_4$ to reach the point $P_6$, whereby the torch 4 continuously proceeds with weaving from the point $P_4$ to the point $P_6$ along the shown dotted line in accordance with the welding condition "01" and the timer "1". The weaving pattern from the point $P_4$ to the point $P_6$ is created on the basis of the positional information on the point $P_2$ to the point $P_7$ and the one-pitch information "1" similarly to the above.

When the torch 4 reaches the point $P_6$, the computer 7 outputs the subsequent weaving pattern, i.e., the weaving pattern from the point $P_6$ to the point $P_8$, which weaving pattern is created on the basis of positional infromation on the point $P_4$ to the point $P_9$ in a method similar to the above. Namely, according to this embodiment, the loci of circular arcs are obtained with reference to front and rear points except for the start points $P_2$ and $P_3$, and in this case, the locus of the circular arc $\widehat{P_6P_8}$ is obtained with reference to the point $P_6$ and the front and rear points $P_4$ and $P_8$ while the locus of the circular arc $\widehat{P_7P_9}$ is obtained with reference to the point $P_7$ and the front and rear points $P_5$ and $P_9$. The torch 4 proceeds with weaving from the point $P_6$ to the point $P_8$ along the thus created weaving pattern shown by the dotted lines in accordance with the welding condition "01" and the timer "1". This also applies to that between the point $P_8$ and the point $P_{10}$.

Thus, the forward end of the torch 4 performs weaving welding of the respective circular arc portions while sequentially vaying the amplitude in FIG. 7 and completes the weaving at the point $P_{10}$, to be moved to the point $P_{12}$ by linear interpolation, thereby to complete the welding process.

Figure 10:
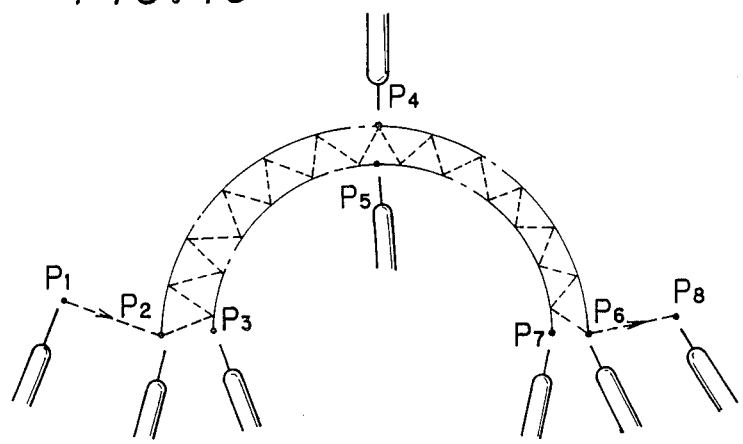
FIG. 10 to 13 are views showing modes of data input with respect to modifications of the second embodiment of the present invention.

In addition to the aforementioed second embodiment, the present invention can be subjected to various modifications as hereafter described, for example:

(I) Although the entire circle has been taught to be welded as the contour defining the interspace between the welded members along the weld line, arbitrary circular arc configurations can be taught to be welded according to the present invention. For example, when a contour defining the interspace between welded members along a weld line is a circular arc portion shown in FIG. 10, at least a pair of mid points $P_4$ and $P_5$ are taught in addition to a pair of welding start points $P_2$ and $P_3$ and a pair of welding end points $P_6$ and $P_7$, so that the loci of circular arcs $\widehat{P_2P_4}$ and $\widehat{P_4P_6}$ can be determined by positional data on $P_2$, $P_4$ and $P_6$ and the loci of circular arcs $\widehat{P_3P_5}$ and $\widehat{P_5P_7}$ can be determined by positional data on the points $P_3$, $P_5$ and $P_7$, whereby amplitude variable circular arc weaving can be performed by application of the present invention.

Figure 11:
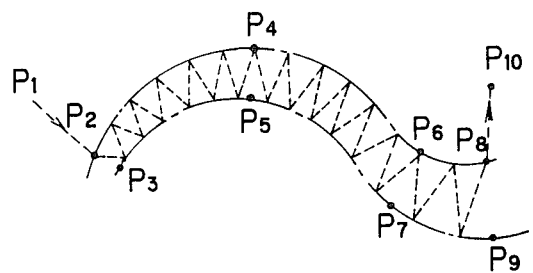

(II) Expanding the idea of the above item (I), the present invention can also be applied to the case where a contour defining the interspace between welded members along a weld line is in an arbitrary configuration. In the case of a contour configuration shown in FIG. 11 for example, this contour is divided into an appropriate number (six in FIG. 11) of circular arc elements, and two pairs of mid points $P_4$, $P_5$ and $P_6$, $P_7$ are taught in addition to a pair of welding start points $P_2$ and $P_3$ and a pair of welding end points $P_8$ and $P_9$ as the minimum required positional data for determining the loci of these circular arc elements. The loci of the circular arcs $\widehat{P_2P_4}$ and $\widehat{P_4P_6}$ are determined by the positional data on the points $P_2$, $P_4$ and $P_6$ while the loci of the circular arcs $\widehat{P_3P_5}$ and $\widehat{P_5P_7}$ are detemined by the positional data on the points $P_3$, $P_5$ and $P_7$. The locus of the circular arc $\widehat{P_6P_8}$ is determined by the positional data on the points $P_4$, $P_6$ and $P_8$ and the locus of the circular arc $\widehat{P_7P_9}$ is determined by the positional data on the points $P_5$, $P_7$ and $P_9$. Although the contour is divided into three circular arc parts (the number of the circular arc elements is six) in FIG. 11, more precise amplitude variable circular arc weaving can be performed as a matter of course, by dividing the same into a larger number of circular arc portions to be taught.

Figure 12:
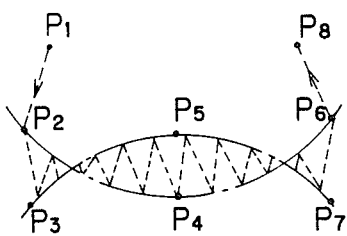

Further, for example, when a contour defining the interspace between welded members along a weld line is in a configuration shown in FIG. 12, this contour may be regarded as being formed by two circular arc elements (one circular arc portion) to teach a pair of mid points $P_4$ and $P_5$ in addition to a pair of welding start points $P_2$ and $P_3$ and a pair of welding end points $P_6$ and $P_7$ so that the loci of circular arcs $\widehat{P_2P_4}$ and $\widehat{P_4P_6}$ can be determined by the positional data on the ponts $P_2$, $P_4$ and $P_6$ and the loci of circular arcs $\widehat{P_3P_5}$ and $\widehat{P_5P_7}$ can be determined by the positional data on the points $P_3$, $P_5$ and $P_7$, whereby amplitude variable circular weaving can be performed through application of the present invention.

Figure 13:
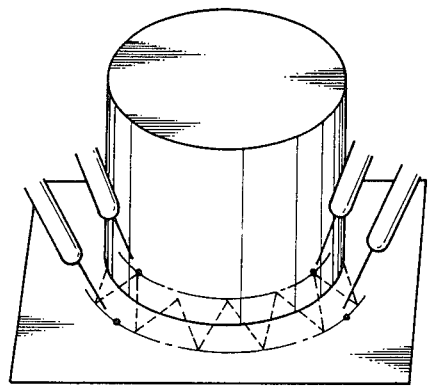

(III) Although the aforementioned two embodiments have been described with reference to the case of performing amplitude variable circular weaving on downwardly directed bevels, the present invention is applicable to weld joint configurations other than the same. In case of a horizontal fillet shown in FIG. 13, for example, the inner circle may be taught in a position higher than the outer circle.

(IV) The data for determining the loci of the circular arc elements may not necessarily be supplied by setting through concrete location of the torch 4. For example, some of previously assumable patterns of circular arc loci or patterns of circular arc portions fromed by pairs of circular arcs may be prepared to be selected and inputted in a menu system. In this case, such data may be inputted with teaching data on welding start points $P_2$ and $P_3$ and welding end points $P_{10}$ and $P_{11}$, for example. What is important is that data on the welding start and end points and data on the loci of the circular arc elements therebetween are sufficiently supplied by known means. Even if the data on the loci of the circular arcs are supplied by concrete location of the torch 4 as in the aforementioned second embodiment, the positional information on each point may not necessarily be supplied in a pair. The form of such data supply depends on the alogorithm of circular arc locus recognition and the algorithm of weaving pattern creation, and if data capable of distinguishing points on the inner circle from the points on the outer circle are added to be inputted for example, the points on the inner circle and those on the outer circle may not be alternately taught as in the aforementioned embodiments.

In a third embodiment of the present invention, it is assumed that a workpiece WK is similar to that in the aforementioned first embodiment. Namely, bevels B1 and B2 are respectively provided in respective ones of two horizontal plates W1 and W2 serving as first and second welded members as shown in FIG. 1, which horizontal plates W1 and W2 are welded in a butting manner. It is assumed that the space of butting is made nonuniform by some cause as shown in FIGS. 1 and 14, such that the welded members are in contact with each other at lower ends in the figures while the same are slightly spaced toward the upward (faraway) direction.

Figure 14:
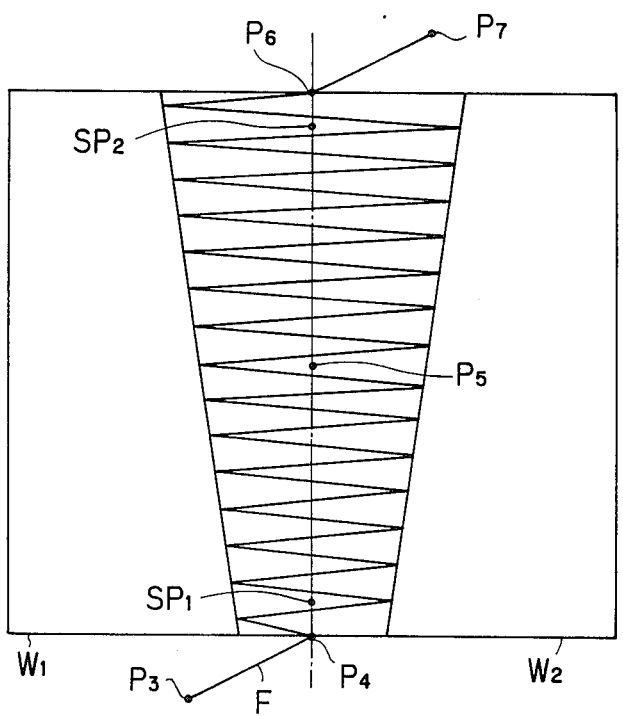
FIG. 14 is a view showing the manner of setting teaching points and the locus of a torch in a third embodiment of the present invention.

FIG. 14 shows the bevel portion of the workpiece WK of FIG. 1 in a state viewed from above.

Processing in the third embodiment of the present invention is now described with reference to portions related to the features of the present invention. The first processing is teaching, which is described with reference to FIG. 14 showing positional relation of teaching points and the like and FIG. 15 showing steps of the program, in addition to the FIG. 1.

(3-1) The operator of this apparatus operates the switch SM, to select the manual mode M as shown in the FIG. 1. Then, the switch SV is operated to make the computer 7 store a travel speed $V_m$ of the torch 4 in the manual mode while setting a travel speed $V_0$ in the automatic mode. Then the selector switch SE is switched to the switched to the switching position $SE_1$ as shown in the FIGURE, and the ten-key TK is operated to set linear interpolation "L". Further, the switch SW is operated to move an electrode outlet end of the torch 4 in a position (position $P_0$ shown by a one-dot chain line in FIG. 1) in the size of 1 with respect to a surface G of a prescribed electric conductor. Then the switch STA is ooperated so that the computer 7 fetches positional data ($X_0$, $Y_0$, $Z_0$, $O_0$ and $\psi_0$) on the point $P_0$, linear interpolation "L" and the speed $V_0$ as the content of the first step of the program. With respect to the movement of the torch 4 to the point $P_0$, the positional data on the point $P_0$ may be previously stored in the computer 7, to be called to execute an automatical position-control.

(3-2) The operator operates the selector switch SE and the ten-key TK to select "99" as the sensor menu number SEM No., and to further set a sensing command "S". Then the switch STA is operated so that the positional data on the point $P_0$, sensing "S" and SEM No. "99" are fetched as data with respect to a step No. 2.

Simultaneously with this, the computer 7 outputs a command by SEM No. "99" to switch the switching means 5d (solid line in the FIGURE) and deliver the welding electrode 4a. When the forward end of the delivered electrode 4a is brought into electrical contact with the surface G, the circuit is closed whereby a detection signal is outputted from the sensor 5c, and the computer 7 receives the same to stop delivering of the electrode 4a (this processing is referred to as extension alignment). In this state, the welding operating point with respect to the torch 4 comes to the forward end position of the electrode 4a thereof. Then the switching means 5d is returned to the original state. Although the processing (3-1) and (3-2) has not been described with refernce to the first and second embodiments, the same is similarly performed in the first and second embodiments.

(3-3) The switch SW is operated to move the torch 4 to a first sensing start point $SP_1$ close to a welding start point $P_4$. Then the menu number SEM No. "99" is cleared and the selector switch SE and the ten-key TK are operated to set linear interpolation "L". Then the switch STA is operated so that positional data on the point $SP_1$, linear interpolation "L" and speed $V_0$ are fetched as data with respect to a step No. 3.

(3-4) The sensing command "S" is set through the selector switch SE and the ten-key TK, and "01" is set as SEM No. Then the switch STA is operated, so that the computer 7 fetches the information of sensing by SEM No. "01" as data with respect to a step No. 4. This sensing is described hereinafter. (3-5) The switch SW is operated similarly to the above (3-3), to move the torch 4 to a second sensing start point $SP_2$ close to a welding end point $P_6$. Then linear interpolation "L" is set by operating the selector switch SE and the ten-key TK to operate the switch STA, whereby positional data on the point $SP_2$, linear interpolation "L" and speed $V_0$ are fetched as data with respect to a step No. 5.

(3-6) Sensing "S" is set through the selector switch SE and the ten-key TK similarly to the aforementioned (3-4), and further, "02" is set as SEM No. Then the switch STA is operated so that the computer 7 fetches the information of sensing by SEM No. "02" as data with respect to a step No. 6. This sensing is also described hereinafter.

(3-7) The operator operates the switch SW, to located the torch 4 in an arbitrary point $P_3$ close to the welding start point $P_4$. Then the selector switch SE is switched to the switching position $SE_1$, and linear interpolation "L" is set by operating the ten-key TK. Then the switch STA is operated so that the computer 7 fetches positional data on the point $P_3$ and the data of linear interpolation "L" as data with respect to a step No. 7.

(3-8) The operator locates the torch 4 in the welding start point $P_4$ in a condition suitable for welding, by operating the switch SW. Then the selector switch SE and the ten-key, are operated to select arc sensing "$A_s$", SEM No. "01", welding condition "01" and correction system "98". Within these, "01" indicating the welding condition is asumed to be a number set in correspondence to conditions suitable for weaving. The arc sensing "$A_s$" and the correction system "98" are set to indicate teaching of that the welding thereafter is performed in a mode of amplitude variable weaving utilizing arc sensing. SEM No. "01" means that the point $P_4$ is corrected in a correction amount by the result of sensing of the aforementioned first point in execution of the processing. Data with respect to a step No. 8 are inputted by such operation.

(3-9) The operator operates the switch SW to locate the torch 4 in an arbitrary mid-point $P_5$ (referred to as a dummy point). Then the selector switch and the ten-key TK are operated to set arc sensing "$A_s$", SEM No. "01", F No. "7" and correction system "02". Within these, F No. "7" is adapted to designate the dummy point, and the correction system "02" is adapted to designate a downwardly directed fillet as the welding joint configuration. Then the switch STA is operated so that the computer 7 fetches positional data on the dummy point $P_5$, arc sinsing "$A_s$", SEM No. "01", F No. "7" and correction system "02" as data with respect to a step No. 9.

(3-10) The torch 4 is located in the welding end point $P_6$ in a condition suitable for welding by operation of the switch SW. Then, the selector switch SE and the ten-key TK are operated to select arc sensing "$A_s$", SEM No. "02" and correction system "98". Within these, meaning of setting of arc sensing "$A_s$" and correction system "98" is as hereinabove described, and SEM No. "02" means that the point $P_6$ is corrected in a correction amount by the result of sensing of the aforementioned second point in execution of processing.

(3-11) Finally the operator operates the switch SW, to locate the torch 4 in an arbitrary refuge point $P_7$ linearly shiftable from the welding end point $P_6$. Then the selector switch SE and the ten-key TK are operated to set linear interpolation "K" thereby to operate the switch STA, so that positional data on the point $P_7$ and linear interpolation "L" are fetched as data with respect to a step No. 11.

Figure 16:
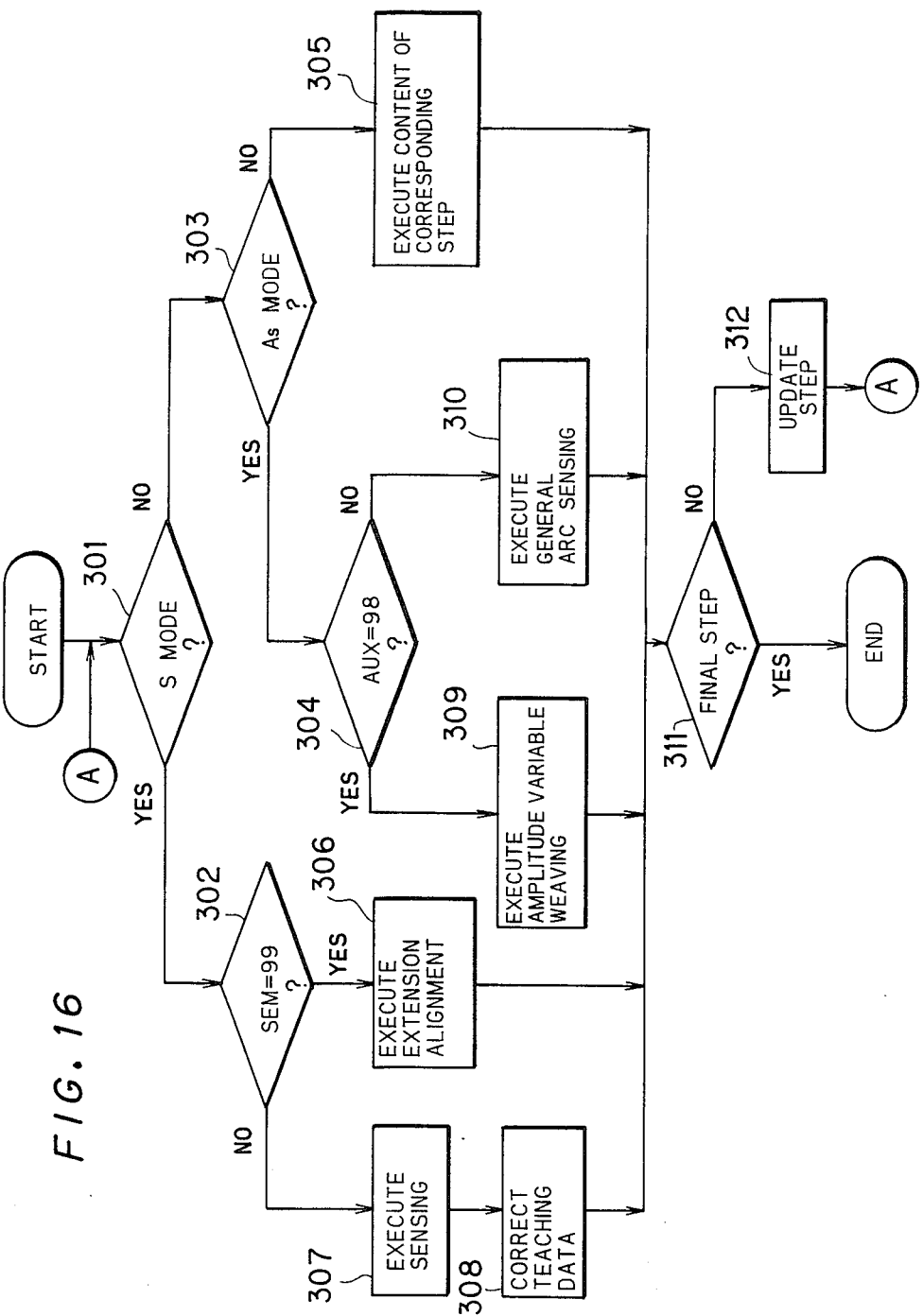
FIG. 16 is a flow chart showing the operation of the third embodiment of the present invention.

The teaching is completed in the aforementioned manner. Then the operator switches the mode selector switch SM to the test mode TE to operate the switch STA, whereby the welding robot RO executes operation similar to the operation in welding as hereinafter described, without performing welding. The operator monitors the operation, to perform corrections when there are errors in the data, in teaching or the like. Then the operator re-locates the torch 4 and sets the mode selector switch SM at the automatic mode A, to operate the switch STA. The operation for actual weaving is started from this point of time, and the processing executed by the computer 7 and the operation of the body of the welding robot RO based on command output from the computer 7 thereafter are now described with reference to a flow chart of FIG. 16.

At processing 301, the computer 7 first determines whether or not the corresponding step (corresponding step in FIG. 15) is for sensing "S", to advance the process to processing 302 in the case of YES while advancing the process to processing 303 in the case of No. At the processing 303, a determination is made as to whether or not this step is for arc sensing "$A_s$", to advance the process to processing 304 in the case of YES while advancing the process to processing 305 in the case of NO. Processing other than the sensing "S" and arc sensing "$A_s$" is executed at the processing 305. Along the content of the programming (teaching) of FIG. 15, movement of the torch 4 (steps Nos. 1, 3, 5, 7 and 11) through linear interpolation "L" is executed.

At the processing 302, a determination is made as to whether or not SEM No. is "99". If the result of the determination is YES, the process is advanced to processing 306 while the same is advanced to processing 307 in the case of NO. Extension alignment is executed at the processing 306, whereby the length of extension of the electrode 4a of the torch 4 is restricted to a prescribed legth 1. On the other hand, sensing is executed at the processing 307. Namely, the switching means 5d is first switched to the current sensor 5c side, and then sensing is executed through electrical contact of the forward end of the electrode 4a of the torch 4 and the workpiece WK. For example, the torch 4 is swung from the first sensing start point $SP_1$ in the horizontal direction (lateral direction in FIG. 14), so that positional data on a contact point (denoted by $SP_{11}$) with the left-side horizontal plate W1 and a contact point (denoted by $SP_{12}$) with the right-side horizontal plate W2 are fetched. On the basis of the fetched positional data on $SP_{11}$ and $SP_{12}$, the computer 7 performs arithmetic on a mid point $P_1'$ of the interspace between the horizontal plates W1 and W2, to obtain difference $\Delta P_1$ between the same and the positional data on the point $P_1$. Also with respect to the second sensing start point $SP_2$, $\Delta P_2$ is obtained in a similar manner. These sensing positional data $\Delta P_1$ and $\Delta P_2$ are stored as data with respect to SEM Nos. 01 and 02 respectively. At processing 308 subsequent to the processing 307, the teaching data are corrected through the sensing positional data $\Delta P_1$ and $\Delta P_2$ thus obtained. Namely, positional data on points $P_4$ and $P_5$ with designation of SEM No. 01 are corrected by the sensing positional data $\Delta P_1$, and positional data on a point $P_6$ with designation of SEM No. 02 is corrected by the sensing positional data $\Delta P_2$. Such sensing correction is effective for correcting individaul differences between welded members and individual mounting errors.

The process is advanced to processing 309 when the result of the determination at the processing 304 is YES, while the same is advanced to processing 310 in the case of NO. General arc sensing is executed at the processing 310. On the other hand, amplitude variable weaving is executed at the processing 309 through arc sensing according to the present invention. FIG. 17 is an explanatory diagram showing the amplitude variable method of this case. Referring to FIG. 17, symbol (a) denotes horizontal movement of the torch 4 within the interspace between the horizontal plates W1 and W2, while symbol (b) denotes change in the welding current following the horizontal movement of the torch 4 in correspondence to (a). It is known that the welding current is increased as the distance from the forward end of the electrode 4a to the workpiece (horizontal plates W1 and W2 in FIG. 17) is decreased.

It is assumed here that the interspace between the horizontal plates W1 and W2 is as shown by the solid line at FIG. 17(a). In this case, the change in the welding current following horizontal movment of the torch 4 is as shown by the solid line at FIG. 17(b). A correct amplitude range of the torch 4 at this point must between positions $P_a$ and $P_b$ as shown by one-chain dot lines at FIG. 17(a). On the other hand, it is assumed that the interspace between the horizontal plates W1 and W2 is slightly narrowed at another point as shown by dotted lines at FIG. 17(a). In this case, the welding current is changed as shown by dotted lines at FIG. 17(b), following horizontal movement of the torch 4. In such a different point, the correct amplitude range of the torch 4 must be interposed between positions $P_c$ and $P_d$.

Figure 4:
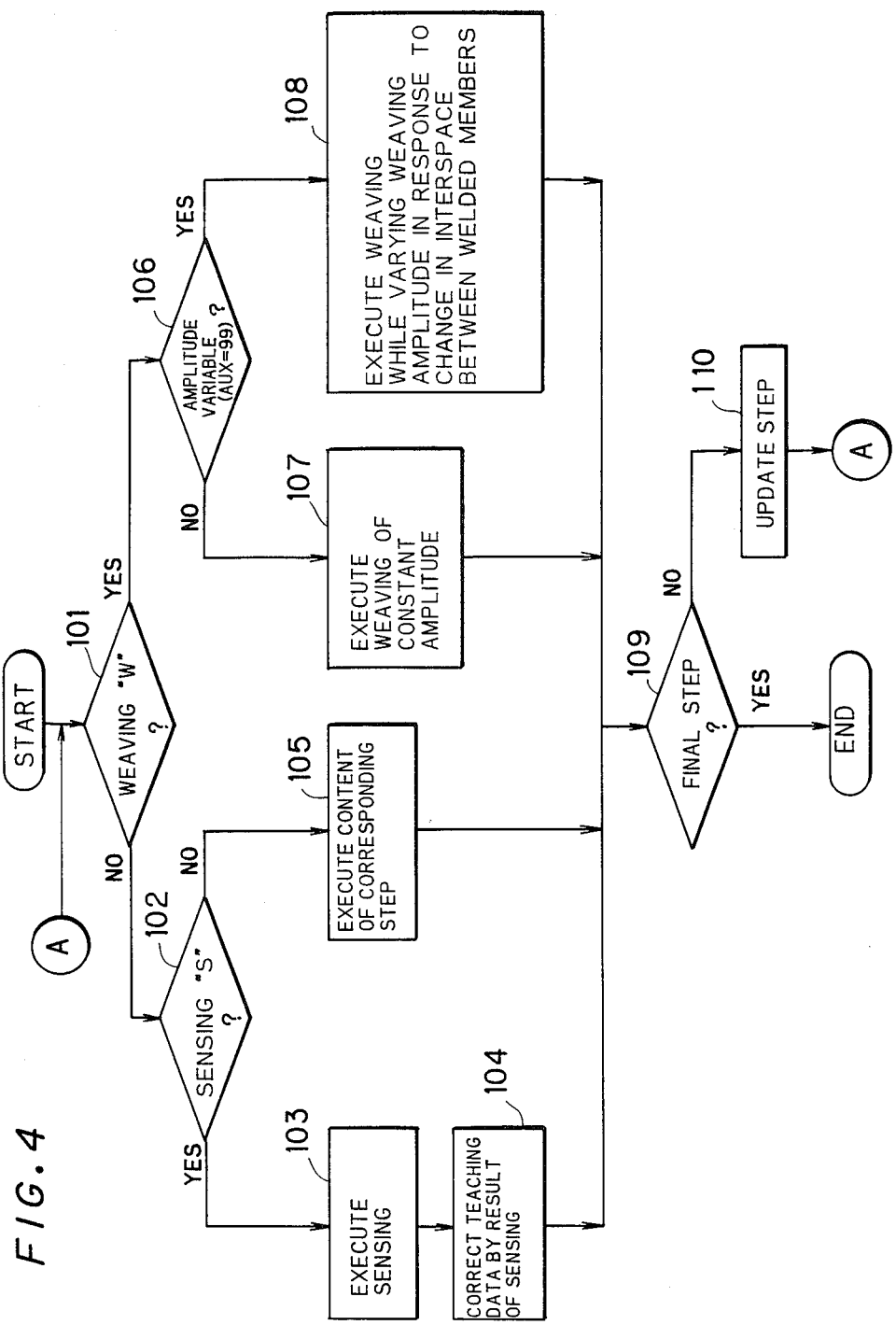
FIG. 4 is a flow chart showing the operation of the welding robot according to the first embodiment of the present invention.

In order to recognize the correct direction inverting positions $P_a$, $P_b$, $P_c$ and $P_d$ of the torch 4 in the third embodiment of the present invention, the welding current is detected by the current sensor 5e of FIG. 1. When the amplitude variable weaving at the processing 309 shown in FIG. 4 is executed, the computer 7 compares the detected welding current with a prescribed threshold value (one-dot chain line at FIG. 17(b)), thereby to invert progress of the torch 4 at a point where the welding current reaches the threshold value. Namely, oscillation of the torch 4 is performed only within a range in which the welding current is lower than the threshold value. Thus, the weaving amplitude is correctly changed following the change in the interspace between the horizontal plates W1 and W2 in the weld line direction.

When the aforementioned processing 305, 306, 308, 309 or 310 is completed, a determination is made at processing 311 as to whether or not the corresponding step is a final step. If the step is the final step, the series of processing is completed, while the step is updated at processing 312 if the same is not the final step, and the process is returned to the processing 301 to repeat the aforementioned processing.

FIG. 14 shows the locus F (expecting sensing part) of the forward end of the torch 4 in case of applying the step data of FIG. 15 to such a processing flow. In this case, the forward end of the torch 4 is first located in the point $P_0$ (FIG. 1) in response to the data of the step Nos. 1 and 2, so that the aforementioned extension alignment is executed. Then the forward end of the torch 4 is moved to the first sensing start point $SP_1$ by linear interpolation in response to the data of the step Nos. 3 and 4 so that the aforementioned sensing is executed, and then the same is moved to the second sensing start point $SP_2$ by linear interpolation in respose to the data of the step Nos. 5 and 6, so that the aforementioned sensing is similarly executed.

Then the forward end of the torch 4 is moved through the point $P_3$ to the point $P_4$ by linear interpolation in response to the data of the step No. 7. The same starts welding from the point $P_4$, to perfomed weaving while varying the amplitude as hereinabove described following the change in the interspace between the horizontal plates W1 and W2 in the weld line derection. Since the point $P_5$ is designated as a dummy point by F No. "7", the torch 4 is advanced while neglecting this point. Thus, the forward end of the torch 4 performs weavig while gradually widening the amplitude in FIG. 14, to be moved to the refuge point $P_7$ by linear interpolation upon completion of weaving at the point $P_6$, thereby to terminate the series of welding processing.

Figure 18:
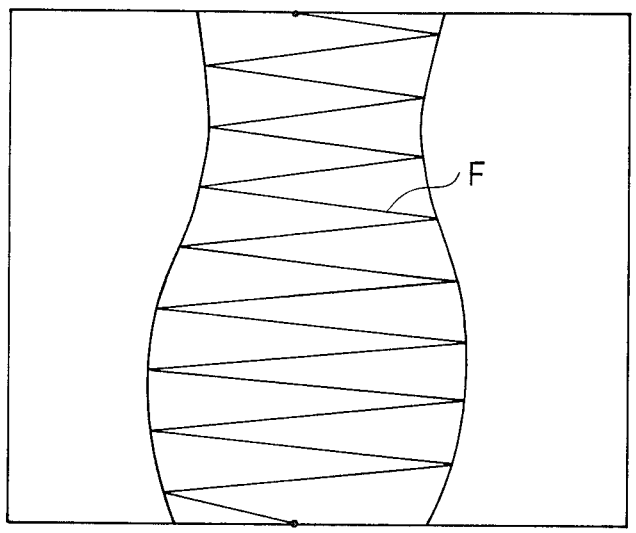
FIG. 18 is an explanatory diagram of a modification of the third embodiment of the present invention.

Although forwardly uniformly widening change in the interspace as shown in FIG. 1 and 14 has been considered in the aforementioned third embodiment, the present invention can also be applied to a workpiece the interspace for which is nonuniformly changed for example, as shown in FIG. 18. The same is also applicable to workpieces other than horizontal plates.

Figure 19:
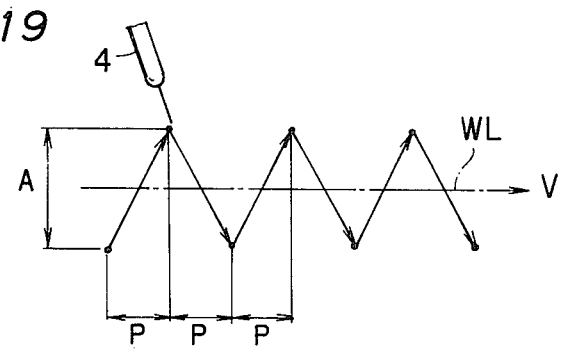
FIG. 19 and 20 are explanatory diagrams of weaving amplitude and weaving pitch.

In the aforementioned first to third embodiments, the weaving amplitude A and the weaving pitch P are previously set as constant values in the computer 7 as shown in FIG. 19. The forward end of the torch 4 of the welding robot RO is oscillated in accordance with a weaving pattern determined by the constant weaving amplitude A and pitch P, to automatically perform weaving. The welding speed V is previously set in the computer 7 as the advancing speed of the torch 4 toward the direction of the weld line WL, and oscillation of the torch 4 is performed in an oscillation cycle (oscillation time for one pattern) achieving the welding speed V in execution of weaving.

Figure 20:
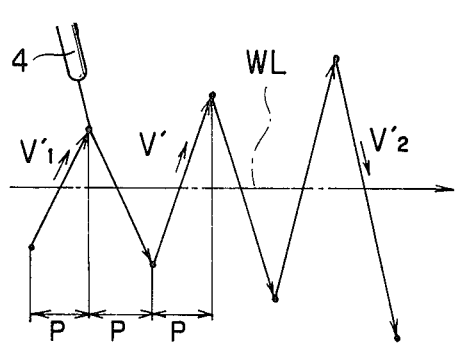

In the aforementioned first to third embodiments, on the other hand, the weaving amplitude is automatically varied with the nonuniformity in the interspace between the welded members as shown in FIG. 20, so that the weaving is executed by the welding robot. However, since the welding speed V is previously set in the computer 7 as the advancing speed of the torch 4 in the direction of the weld line WL in this case, the welding is advantageouly performed at a desired speed in the weld line direction, while the advancing speed V' of the torch 4 in the weaving direction is varied with the weaving amplitude. Namely, the speed $V_1'$ in the weaving direction in case of small amplitude is relatively small and the speed $V_2'$ in the weaving direction in case of large amplitude is relatively large. As a consequence, the amount of metal deposited is slightly nonuniform in response to the weaving amplitude which has the effect of reducing of welding accuracy.

Description is now made on a fourth embodiment of the present invention for solving the aforementioned problem by making uniform the amount of deposited metal in a case of performing amplitude variable weaving, thereby to further improve the welding accuracy. In the fourth embodiment, a workpiece WK is assumed to be similar to those in the aforementioned first and thrid embodiments. Namely, as shown in FIG. 1, it is considered that two horizontal plates W1 and W2 serving as first and second welded members are respectivley provided with bevels B1 and B2, so that the horizontal plates W1 and W2 are welded in a butting manner. It is assumed that the space of butting is made nonuniform by some cause, such that the horizontal plates are in contact with each other at their lower ends, as shown in the FIGURE, but slightly spaced in the upward (faraway) direcition.

Description is now provided on processing in the fourth embodiment of the present invention, with reference to parts related to the features of the present invention. The first operation of the operator is teaching, and teaching points can be made as eight points of $P_1$ to $P_8$ shown in FIG. 2 similarly to the aforementioned first embodiment, for example. As hereinabove described, $P_1$ and $P_8$ are refuge points, $P_2$ is a welding start point and $P_7$ is a welding end point. $P_3$ and $P_4$ are pattern points (teaching one pattern of weaving by $P_2$, $P_3$ and $P_4$), and $P_5$ and $P_6$ are dummy points (change in bevel width is defined by four points of $P_3$ to $P_6$) for recognizing change in the interspace. The operator operates data fetching switches while sequentially locating the torch 4 in the respective points $P_1$ to $P_8$ in the manual mode by the remote operation panel 8, thereby to teach positional data of the respective points to the computer 7. Simultaneously at this time, all of welding conditions such as welding current, welding voltage and welding speed and other necessary data are taught. The welding conditions may be previously set as a menu in response to the type of the workpiece to be selected by ten-key TK, or may be individually inputted by numerical values through the ten-key TK. In any case, the welding speed $V_c$ that is optimum for the workpiece is set in advance to actual welding. This welding speed $V_c$ defines the advancing speed of the torch 4 in the weaving direction.

Figure 21:
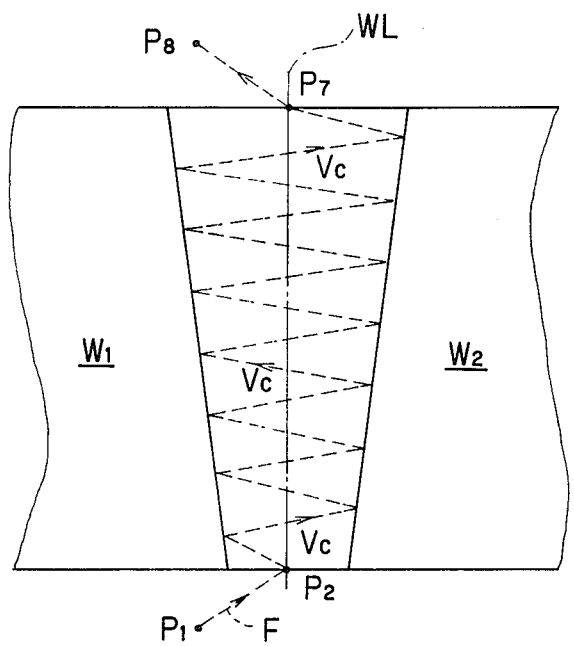
FIG. 21 is an explanatory diagram showing the locus of a torch in a fourth embodiment of the present invention.

When the teaching is completed and the operator turns on the start switch of the remote operation panel 8, the welding robot RO executes actual weaving through control by the computer 7. Dotted lines in FIGS. 2 and 21 indicated the locus F of the forward end of the torch 4 in actual weaving. The torch 4 is moved from the point $P_1$ to the point $P_2$ by linear interpolation, and starts welding from the point $P_2$ to weave the section through the points $P_3$ and $P_4$ to the point $P_7$ while varying the weaving amplitude. The advancing speed of the torch 4 in the weaving direction at this time is always retained in the previously set optimum speed $V_c$ regardless of change in the weaving amplitude, whereby the amount of deposited metal is made constant without regard to change in the bevel width, to achieve weaving of high quality. Upon completion of welding at the point $P_7$, the torch 4 is moved to the point $P_8$ by linear interpolation, thereby to complete the series of welding processing.

Although the above description was provided on amplitude variable weaving in the case of forwardly linearly widening nonuniformity in the interspace, the fourth embodiment of the present invention can be applied to any nonuniformity in the interspace in so far as it involves amplitude variable welding. The method of teaching nonuniformity can be arbitrarily selected and is not necessarily performed by concrete location of the torch 4 as hereinabove described, and, for example, some previously assumable change patterns of the interspace may be prepared to be selected and inputted into a menu system. The fourth embodiment of the present invention is not influenced by such differences in the teaching method.

Although the present invention has been described in detail with respect to the embodiments shown in the drawings, the present invention is not restricted to the aforementioned embodiments. The scope of the present invention is to be limited only by the terms of the appended claims.

We claim:

1. A method of controlling a welding robot for weaving first and second welded members by a welding robot having a welding torch and arms for movably supporting said welding torch while oscillating said welding torch along a weld line, comprising the steps of:
    initially storing data on a linear successive change in an interspace between said first and second members that are to be welded along a direction of said weld line, in advance of welding;
    performing arithmetic on the basis of said stored data and thereby obtaining command values for making said welding robot perform a corresponding weaving weld while successively varying a weaving amplitude in response to said change in said interspace; and
    supplying said command values to control said welding robot, wherein
    said step of initially storing data including the steps of teaching a plurality of data input dedicated points for recognizing said change through positioning of said welding torch, and detecting said change on the basis of said data input dedicated points.

2. A method of controlling a welding robot in accordance with claim 1, wherein:
    said stored data are obtained on the basis of data generated by correcting positional data on prescribed points related to a positional relation between said first and second welded members through sensing.

3. A method of controlling a welding robot in accordance with claim 1, further comprising:
    setting a welding speed, said command values for making said welding robot perform weaving including a command for maintaining an advancing speed of said welding torch in a weaving direction at set welding speed.

4. A method of controlling a welding robot in accordance with claim 1, wherein:
    an advancing speed of said welding torch in a weaving direction is controlled at a desired value in performing weaving while varying a weaving amplitude in response to change in an interspace between said first and second welded members.

5. An apparatus for controlling a welding robot for weaving a weld between first and second members separated by a linearly successive changing interspace therebetween by application of a moving welding torch by manipulation of arms supporting said welding torch while oscillating said welding torch along a weld line related to the interspace, comprising:
    means for generating positional data of a plurality of data input dedicated points which are taught through positioning of said welding torch for recognizing a linear successive change of said interspace;
    means for detecting said change of the interspace on the basis of said positional data;
    memory means for storing data on said change as detected with respect to said interspace between said said and second members that are to be securely welded along said weld line therebetween;
    arithmetic means for performing arithmetic on the basis of said stored data to generate corresponding command values for making said welding robot perform weld weaving by successively varying a weaving amplitude of the motion of said welding torch in response to variations encountered in said interspace as the welding progresses; and output means for sequentially outputting said command values to said welding robot to control the same.

6. An apparatus for controlling a welding robot in accordance with claim 5, further comprising:

means for sensing a positional relation between said first and second members at prescribed points of said interspace therebetween to correct said positional data on the basis of said proportional relation.

7. An apparatus for controlling welding robot in accordance with claim 5, further comprising:

means for setting a welding speed, said command values for making said welding robot perform weaving including a command for maintaining an advancing speed of said welding torch in a weaving direction at a predetermined welding speed.

8. An apparatus for controlling a welding robot in accordance with claim 5 further comprising:

means for controlling an advancing speed of said welding torch in a weaving direction at a desired value in performing weaving while varying a weaving amplitude in response to change in an interspace between said first and second members.

9. A method of controlling a welding robot for weaving a weld between first and second members by a welding robot having a welding torch and arms for movably supporting said welding torch while oscillating said welding torch along a weld line, comprising the steps of:

initially storing data on linear successive change in an interspace between said first and second members along a direction of said weld line, in advance of welding;

obtaining command values for making said welding robot perform said weaving while successively varying a weaving amplitude in response to said change in said interspace by performing arithmetic on the basis of said stored data; and supplying said command values to said welding robot, wherein said step of initially storing data including the steps of storing information of a plurality of patterns of said linear successive change, and selecting said information of one of said patterns in a menu system.

10. An apparatus for controlling a welding robot for weaving a weld between first and second members separated by a linearly successively changing interspace therebetween by the application of a moving welding torch by manipulation of arms supporting said welding torch while oscillating said welding torch along a weld line related to the interspace, comprising:

means for providing data of a plurality of patterns of linear successive change of said interspace;

means for selecting said data of one of said patterns in a menu system;

memory means for storing said data as selected with respect to said interspace between said first and second members that are to be securely welded along said weld line therebetween;

arithmetic means for performing arithmetic on the basis of said data as stored, to generate corresponding command values for making said welding robot perform weld weaving by successively varying a weaving amplitude of the motion of said welding torch in response to variations encountered in said interspace as the welding progresses; and output means for sequentially outputting said command values to said welding robot to control the same.

* * * * *